(12) United States Patent
Johnson et al.

(10) Patent No.: US 9,628,181 B1
(45) Date of Patent: Apr. 18, 2017

(54) SYSTEMS AND METHODS FOR PROVISIONING AN OPTICAL NETWORK UNIT

(71) Applicants: Milton Johnson, Owens Crossroads, AL (US); Troy Wayne White, Toney, AL (US)

(72) Inventors: Milton Johnson, Owens Crossroads, AL (US); Troy Wayne White, Toney, AL (US)

(73) Assignee: ADTRAN, Inc., Huntsville, AL (US)

( * ) Notice: Subject to any disclaimer, the term of this patent is extended or adjusted under 35 U.S.C. 154(b) by 90 days.

(21) Appl. No.: 14/795,412

(22) Filed: Jul. 9, 2015

(51) Int. Cl.
*H04J 14/00* (2006.01)
*H04B 10/27* (2013.01)

(52) U.S. Cl.
CPC ................... *H04B 10/27* (2013.01)

(58) Field of Classification Search
None
See application file for complete search history.

(56) References Cited

U.S. PATENT DOCUMENTS

| | | | | |
|---|---|---|---|---|
| 8,705,966 B2* | 4/2014 | Zhao | ................... | H04L 12/2416 398/25 |
| 8,873,969 B2 | 10/2014 | Hood et al. | | |
| 8,879,905 B2* | 11/2014 | Li | ................... | H04B 10/0795 398/16 |
| 9,369,203 B1* | 6/2016 | Chan | ................ | H04B 10/07955 |
| 9,379,877 B2* | 6/2016 | Mizutani | ................ | H04J 3/0605 |
| 2004/0057727 A1* | 3/2004 | Lim | ................ | H04L 41/12 398/58 |
| 2008/0031620 A1* | 2/2008 | Hudgins | ................ | H04B 10/075 398/9 |
| 2010/0040371 A1* | 2/2010 | Wu | ................ | H04J 3/1694 398/58 |
| 2011/0205965 A1 | 8/2011 | Sprigg et al. | | |
| 2015/0125149 A1* | 5/2015 | Gao | ................ | H04B 10/25 398/58 |

\* cited by examiner

*Primary Examiner* — Tesfaldet Bocure
(74) *Attorney, Agent, or Firm* — Maynard, Cooper and Gale, P.C.; Jon E. Holland

(57) ABSTRACT

Systems and methods are disclosed that generally pertain to provisioning an optical network unit (ONU) by an optical line terminal (OLT) of a passive optical network (PON). An exemplary provisioning system includes a wireless reader incorporated into the ONU and a transponder unit attached to a fiber optic cable coupled to the ONU. The transponder unit includes a storage element in which is stored provisioning information, such a registration ID associated with the ONU. The wireless reader automatically obtains the provisioning information from the transponder when the fiber optic cable is coupled to the ONU and transmits the provisioning information to the OLT via the fiber optic cable as a part of a discovery procedure. The transmission of the provisioning information in this manner eliminates the need for a service technician to visit a customer premise and manually provide the provisioning information via a POTS port of the ONU.

20 Claims, 5 Drawing Sheets

SYSTEMS AND METHODS FOR PROVISIONING AN OPTICAL NETWORK UNIT

RELATED ART

A passive optical network (PON) is typically constructed as a point to multipoint network that includes a terminal device communicatively coupled to multiple subscriber devices via an optical splitter. The terminal device is generally referred to in the industry as an optical line terminal (OLT) and each of the subscriber devices may be referred to as an optical network unit (ONU). An ONU is sometimes referred to in the art as an optical network terminal (ONT). For convenience, the term ONU is used hereinafter in this disclosure. An OLT typically discovers the connection of a new ONU (or a re-connection of a disconnected ONU) by executing a discovery procedure. The discovery procedure is directed at enabling the OLT to not only identify that an ONU has been newly connected but also to obtain particulars of the service address at which the ONU is located in order to determine which communication service or set of communication services is to be provided to the service address.

A worldwide communication standard that is generally referred to as the G.984 standard defines a method wherein an ONU has to transmit to the OLT, a unique identifying string that provides ONU related information as a part of the discovery procedure. The North American market has adopted a method in accordance with this standard wherein the unique identifying string is input into the ONU via a plain old telephone service (POTS) port that may be provided in the ONU especially when the ONU is intended to provide telephone voice services to a customer. The identifying string can be entered into the POTS port by a service technician using a telephone handset popularly referred to as a buttset.

However, not all customers require voice services. Consequently, in some ONUs, the POTS port is either unavailable or inoperative for transferring the identifying string from the ONU to the OLT. Furthermore, in some cases, even when voice services are provided to a customer, the ONU may be of a type that is mounted outside the customer location and a fiber cable or an Ethernet cable is run from the ONU into the location. As a result, a POTS port at the ONU may be unavailable or impractical for transferring the identifying string from the ONU to the OLT.

It can be understood from such scenarios that a POTS-oriented procedure or even any other procedure that necessitates the presence of a service technician at an ONU for activating ONU delivery services is not only inconvenient in most cases but may also be impractical in certain cases.

BRIEF DESCRIPTION OF THE DRAWINGS

Many aspects of the disclosure can be better understood with reference to the following drawings. The components in the drawings are not necessarily to scale. Instead, emphasis is placed upon clearly illustrating the principles of the disclosure. Moreover, in the drawings, like reference numerals designate corresponding parts throughout the several views. Furthermore, in some instances, similar elements are indicated by the same numerical identifier, with individual elements designated by a specific alphabet appended to the numerical identifier. For example, several fiber optic cables that are identical or substantially similar to each other may be identified by the same numerical identifier, for example, "130," while individual fiber optic cables of these several fiber optic cables are identified as "130a," "130b," "130c" and so on.

DETAILED DESCRIPTION

Throughout this description, embodiments and variations are described for the purpose of illustrating uses and implementations of inventive concepts. The illustrative description should be understood as presenting examples of inventive concepts, rather than as limiting the scope of the concepts as disclosed herein. It should be further understood that the word "example" as used herein is intended to be non-exclusionary and non-limiting in nature. More particularly, the word "exemplary" as used herein indicates one among several examples, and it must be understood that no undue emphasis or preference is being directed to the particular example being described.

Turning now to a general description of the disclosure, the various example embodiments described herein are generally directed to systems and methods pertaining to provisioning an optical network unit (ONU) by an optical line terminal (OLT) of a passive optical network (PON) or other types of network. The provisioning is carried out by using a provisioning system that includes a wireless reader incorporated into the ONU and a transponder unit that is attached to a fiber optic cable coupled to the ONU. The transponder unit includes a storage element in which is stored provisioning data pertaining to certain types of information, such as, for example, a location, a user, and/or a type of service associated with the fiber optic cable. As can be understood in some cases, a fiber optic cable network, such as a Fiber-to-the-home (FTTH) network, may be installed ahead of time before the various ONUs are coupled into the respective drop-side fiber optic cables of the FTTH network. Thus, attaching this transponder unit to a drop-side fiber optic cable eliminates the need to have a service technician provide provisioning related input information via a POTS port of an ONU when an ONU is coupled to a drop-side fiber optic cable at a later time.

Figure 1:
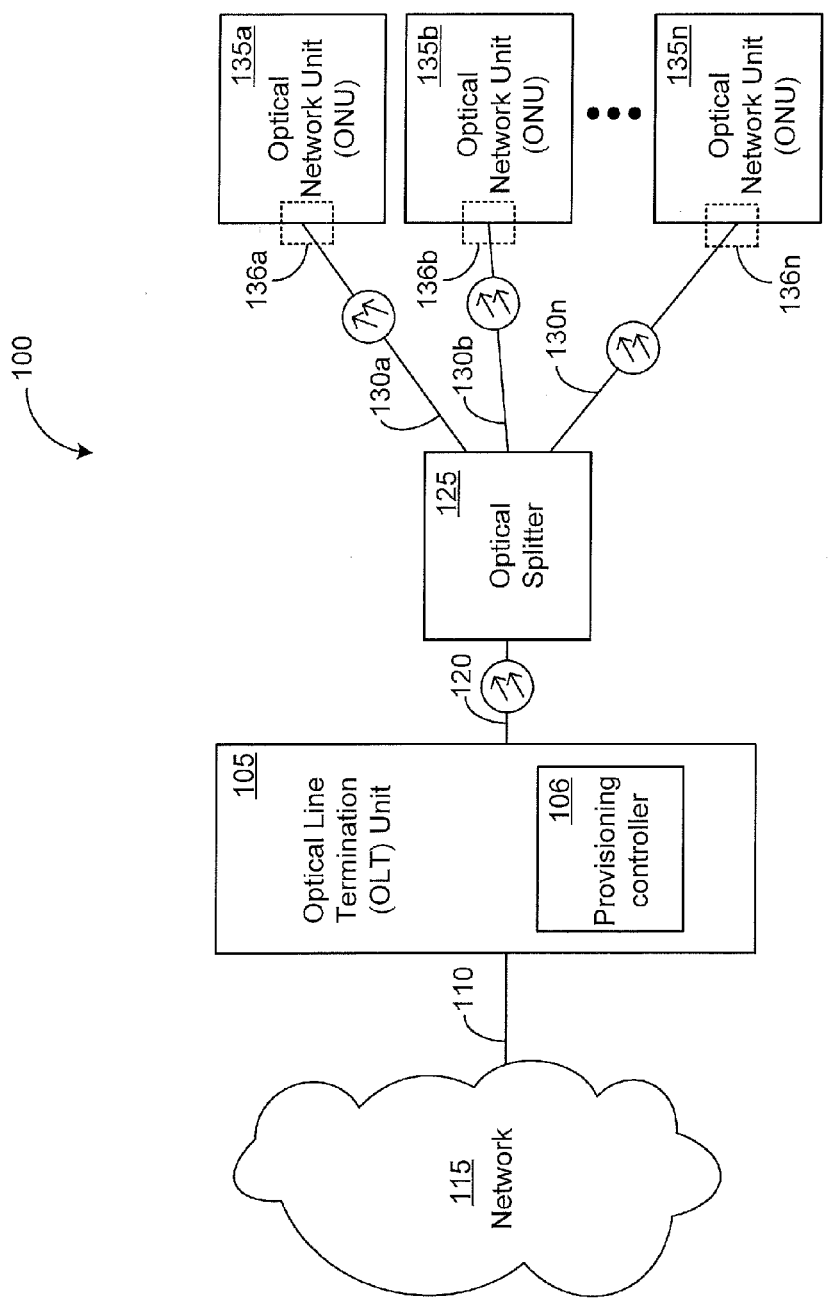
FIG. 1 shows a passive optical network incorporating an exemplary provisioning system in accordance with the disclosure.

FIG. 1 shows a PON 100 incorporating an exemplary provisioning system in accordance with the disclosure. The PON 100 can be a Gigabit PON (GPON) in some implementations. Some elements of the exemplary provisioning system are shown in the form of a provisioning controller 106 housed in an OLT unit 105, and a plurality of communication systems 136a-n that are used for provisioning purposes. Each of the plurality of communication systems 136a-n is associated with an individual drop-side fiber optic cable among fiber optic cables 130a-n coupled to a respective ONU amongst ONUs 135a-n. On the network side of the OLT unit 105, the OLT unit 105 is coupled into a network 115 via one or more communication links, such as a link 110 shown in FIG. 1. The network 115 can be any one of a number of networks that support voice and/or data services, such as for example, the plain old telephone service (POTS) network or the Internet. On the access side of the OLT unit 105, a fiber optic cable 120 couples the OLT unit 105 to an optical splitter 125. The optical splitter 125 is a passive device that is unpowered, thereby leading to the configuration being generally referred to in the industry as a passive optical network. The optical splitter 125 splits a downstream data signal, which is received via the fiber optic cable 120, into "n" number of fiber optic cables 130a-n. In the upstream direction, the optical splitter operates as a combiner that can combine "n" upstream data signals originated by ONUs 135a-n using a time division multiple access (TDMA) format. Although it is contemplated that the network 100 shown by FIG. 1 is passive, it is possible for the network 100 to include active components in other embodiments.

When the PON 100 is a GPON, optical wavelength division multiplexing (WDM) is used so that a single fiber, such as the fiber optic cable 120 and the fiber optic cable 110 can be used for both downstream and upstream data signal transmission. In such an application, a laser transmits downstream data signals using a wavelength (λ) of 1490 nm, while upstream data signals are transmitted using a wavelength (λ) of 1310 nm, although other wavelengths may be used in other embodiments. While each of the ONUs 135a-n may receive the full downstream rate of up to about 2.488 Gbits/s or some other data rate, GPON uses a time division multiple access (TDMA) format to allocate a specific timeslot to each user for upstream data transmission. This approach divides the available bandwidth in such a manner that each user of the ONUs 135a-n is allocated a fraction of the available bandwidth, depending upon how a service provider allocates this bandwidth to each individual customer. Thus, for example, a first customer associated with the ONU 135a (that can be connected, via the OLT unit 105, to the network 115, which in this example scenario is the Internet) may be allocated a 2 Mbits/s bandwidth on the basis of a first service contract between the service provider and the first customer, while a second customer associated with the ONU 135b may be allocated a bandwidth 200 Mbits/s on the basis of a second service contract between the service provider and the second customer. Note that the protocols and wavelengths described above are exemplary. In other embodiments, other protocols and wavelengths may be used.

Furthermore, in many applications, the OLT unit 105 is configured to automatically detect that one or more of the ONUs 135a-n have not been connected, or have been disconnected, from the PON 100 so as to be aware that the bandwidth allocated to these one or more ONUs 135a-n is available for use if needed by other ONUs. The OLT unit 105 is further configured to automatically detect that one or more of the ONUs 135a-n are newly connected (or re-connected) to the PON 100 so as to be able to provision the newly connected (or re-connected) ONUs 135a-n in accordance with their respective provisioning requirements (such as bandwidth allocation, for example).

The automatic detection procedure referred to above can be executed using what is known in the industry as a "discovery" procedure. A worldwide communication standard that is generally referred to as the G.984 standard defines a method wherein each of the ONUs 135a-n transmits certain types of data to the OLT unit 105 as a part of the discovery procedure. The discovery procedure includes transmission of a unique identifying string from the ONUs 135a-n to the OLT unit 105 via a control channel (e.g., a physical layer operations and maintenance (PLOAM) message), so that the OLT unit 105 can automatically identify which specific ONU amongst ONUs 135a-n has been newly connected to the PON 100. This can be carried out by using the provisioning system in accordance with the disclosure. The exemplary provisioning system includes a provisional controller 106 that interacts with communication systems 136a-n, each of which is associated with an individual fiber optic cable among fiber optic cables 130a-n and an individual ONU amongst ONUs 135a-n.

Figure 2:
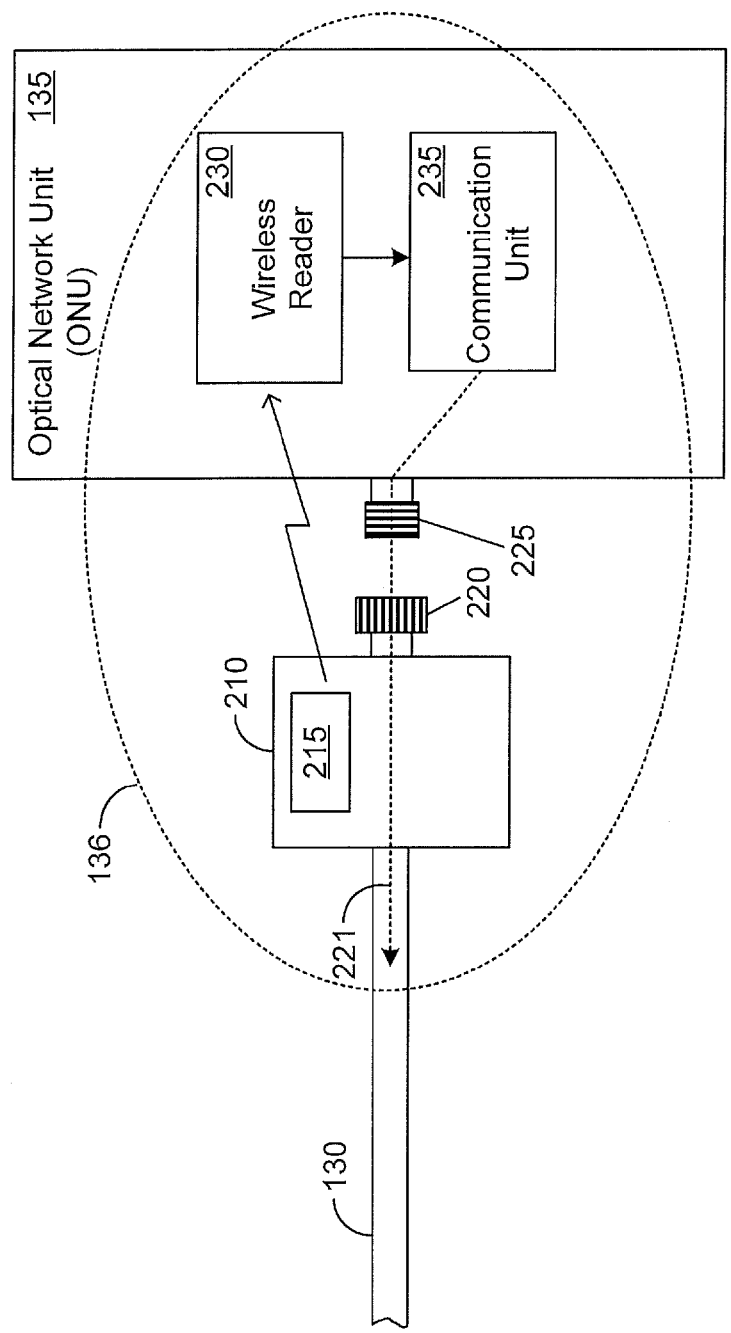
FIG. 2 shows a first exemplary embodiment of a provisioning system that incorporates a first set of exemplary communication elements in accordance with the disclosure.

FIG. 2 shows a first exemplary embodiment of a provisioning system that incorporates a first set of exemplary communication elements in accordance with the disclosure. The first set of exemplary communication elements includes a transponder 215, a wireless reader 230, and a communications unit 235. In this exemplary embodiment, the transponder 215 is located inside an enclosure 210 that is a part of the fiber optic cable 130, the wireless reader 230 is located inside the ONU 135, and the communications unit 235 is also located inside the ONU 135. The communications unit 235 can be used to optically communicate with the OLT unit 105 across the PON, including data as well as control and maintenance information. In some example implementations, the control and maintenance information can be communicated from the ONU 135 to the OLT unit 105 using PLOAM messages. For example, during a discovery procedure, the communications unit 235 can be used to transmit to the OLT unit 105 (via the optical fiber 130), a PLOAM message containing a registration identification (registration ID) string. The registration ID, which is uniquely associated with each individual ONU among the ONUs 135a-n, is retrieved by the wireless reader 230 from the transponder 215 as a part of the registration procedure and provided to the communications unit 235 for incorporating into the PLOAM message that is sent to the OLT 105 via the optical fiber 130. The enclosure 210 in which the transponder 215 is located can be an integral portion of a connector 220 of the fiber optic cable 130. Such an arrangement provides various manufacturing advantages as well as operational advantages such as for example, ease-of-use and performance consistency.

The transponder 215 can include a wireless transceiver (not shown) that can communicate wirelessly with the wireless reader 230 located inside the ONU 135. In a first exemplary implementation, near field communication (NFC) technology is used for this purpose and the spatial separation between the transponder 215 and the wireless reader 230 is tailored for providing NFC connectivity. It may be pertinent to point out that unlike traditional NFC usage in most patch fiber applications (such as cross-connects, for example) where the spatial separation is typically less than 1 cm, the spatial separation between the transponder 215 and the wireless reader 230 in accordance with the disclosure can be larger, such as for example, in a range up to about 6 inches or 8 inches, although other distances are possible. In a second example implementation, in lieu of NFC technology, radio-frequency identification (RFID) technology or other type of short-range communication may be employed.

The transponder 215 incorporates a storage element (not shown) in which various kinds of discovery-related data, equipment-related data, and/or provisioning-related data can be stored. The discovery-related data can include the registration ID that is transmitted by the communication unit 235 to the OLT unit 105 via the optical fiber 130 in the form of a PLOAM message, for example, during the discovery procedure. The equipment-related data can include for example, information regarding the type of the connector 220 (ST type, SC type, FC type, FDDI type etc.); a characteristic of the type of a connector 225 (male, female, bayonet, screw, etc.); manufacturer information associated with the fiber optic cable 130; and a date/time of manufacture of the fiber optic cable 130. The equipment-related data stored in the storage element of the transponder 215 can be read by the wireless reader 230 either during the time of provisioning of the ONU 135 or at a later time, and then transmitted by the communication unit 235 into the fiber optic cable 130 (as indicated by dashed arrow 221) for transmitting to the OLT 105. The OLT 105 may then transmit the equipment-related data to a network management and control interface (not shown).

The provisioning-related data generally includes a provisioning related identifier, such as, for example, an identification of a designated end point for connecting the fiber optic cable 130, a common language equipment identifier (CLEI) code, an address at which the ONU 135 is located, and/or an account number associated with a user of the ONU 135. The provisioning-related data stored in the storage element of the transponder 215 can be read by the wireless reader 230 during the time of provisioning of the ONU 135 and then transmitted via the communication unit 235 into the fiber optic cable 130 (as indicated by dashed arrow 221) for transmitting to the OLT 105.

When either NFC or RFID technology is used for implementing the provisioning system in accordance with the disclosure, the transponder 215 can be a passive device (such as an RFID tag for example) that is automatically provided power by the wireless reader 230 when the fiber optic cable 130 is coupled to the ONU 135. More particularly, when the transponder 215 is implemented in the form of an RFID tag, the transponder 215 is wirelessly powered by the wireless reader 230 for retrieving content (such as the provisioning related identifier) stored in a memory that is a part of the RFID tag. The transponder 215 wirelessly communicates the provisioning related identifier to the wireless reader 230, which provides such information to the communication unit 235, and the communication unit 235 transmits an optical signal carrying the provisioning related identifier across the fiber optic cable 130 to the OLT 105. This process is carried out automatically with no human intervention.

Figure 3:
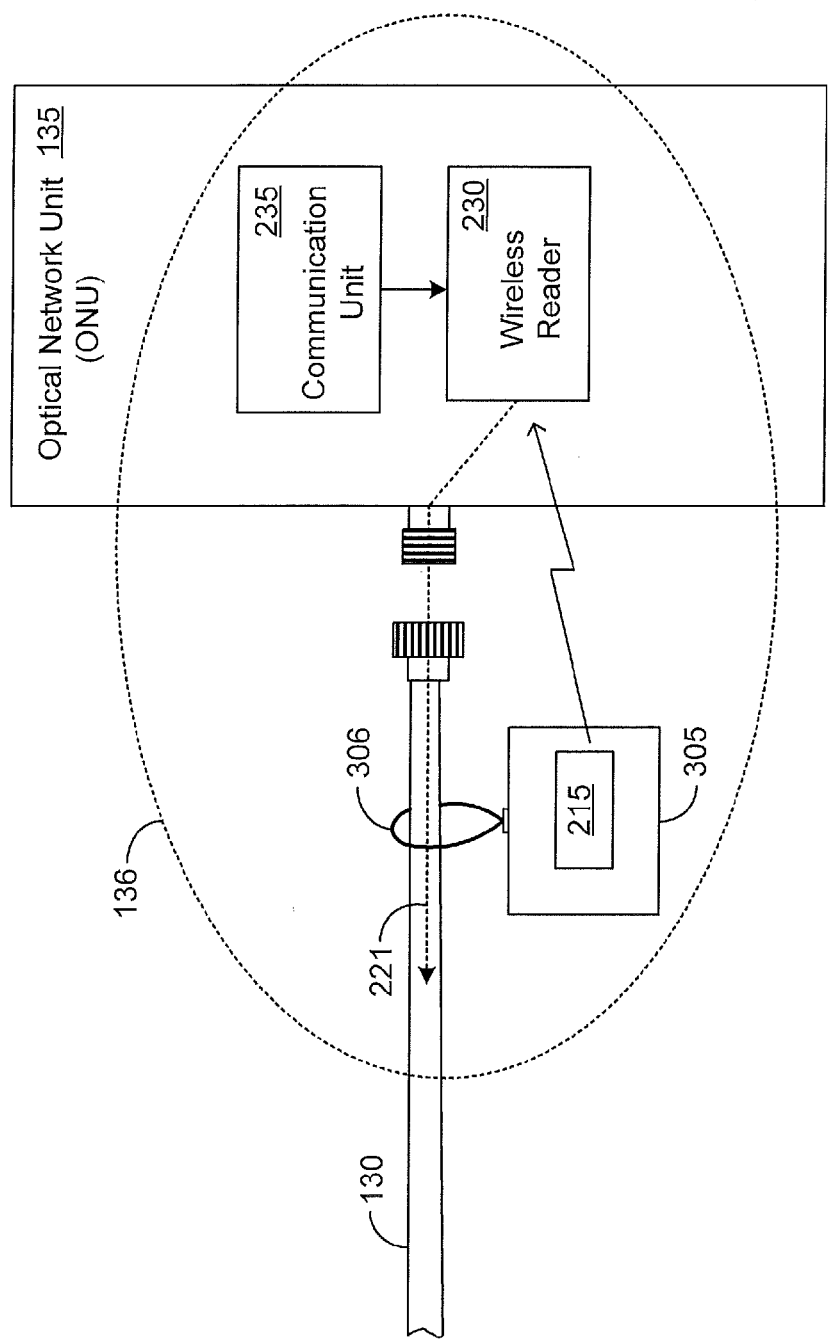
FIG. 3 shows a second exemplary embodiment of a provisioning system that incorporates a second set of exemplary communication elements in accordance with the disclosure.

FIG. 3 shows a second exemplary embodiment of a provisioning system that incorporates a second set of exemplary communication elements in accordance with the disclosure. The second set of exemplary communication elements can be substantially similar to the first set of communication elements that are described above with respect to the embodiment shown in FIG. 2. However, in this exemplary embodiment, the transponder 215 is not located inside an enclosure 210 that is a part of the fiber optic cable 130, but is instead attached to the fiber optic cable 130 using various other ways. In the example implementation shown in FIG. 3, the transponder 215 is embedded inside a housing 305 that is attached to the fiber optic cable 130 by using a strap 306. The strap 306 can be a plastic strap, a piece of wire, or any other suitable material that can be used for attaching the housing 305 to the fiber optic cable 130. The operational aspects of the transponder 215, the wireless reader 230, and the communications unit 235 is similar to that described above with respect to the embodiment shown in FIG. 2 and will not be repeated here in the interest of brevity.

Figure 4:
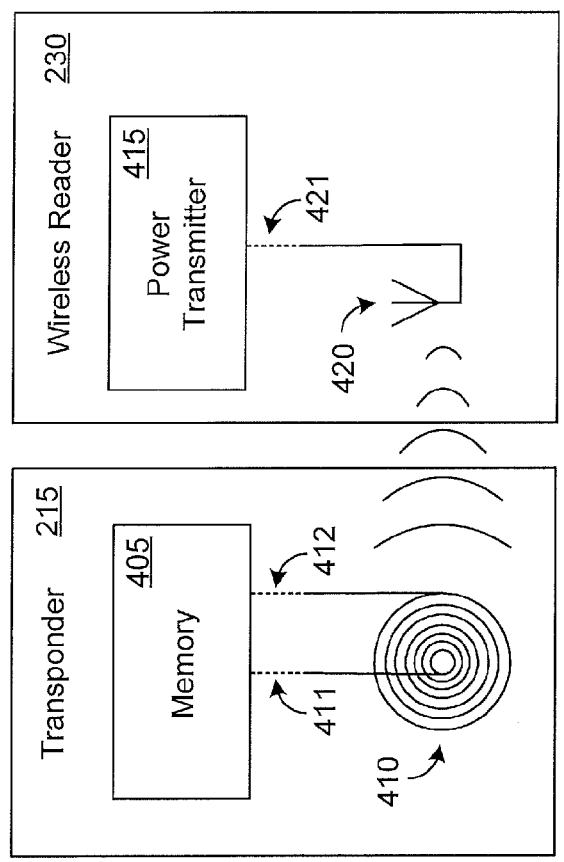
FIG. 4 shows some exemplary components that can be included inside the communication elements shown in FIGS. 2 and 3.

FIG. 4 shows some exemplary components that can be included inside the transponder 215 and the wireless reader 230 referred to above. Specifically, the transponder 215 includes a memory 405 and a first antenna 410, while the wireless reader 230 includes a transceiver 415 and a second antenna 420. In one example implementation, the first antenna 410 is an inductive element (a coil for example) that is designed to receive an electrical signal at a certain frequency. The electrical signal is wirelessly transmitted to the first antenna 410 by the second antenna 420 of the wireless reader 230 in order to provide operating power to the memory 405 and other elements of the transponder 215 and to enable communication between the transponder 215 and the reader 230.

The memory 405 is used to store various kinds of discovery-related data, equipment-related data, and/or provisioning-related data and can also be used to store various kinds of software and/or firmware. In operation, the transceiver 415 provides an electrical signal to the second antenna 420 which wirelessly transmits the signal. When the transponder 215 is placed in the communication range of the wireless reader 230, and particularly as a result of a fiber optic cable being connected to an ONU as described herein, the electrical signal transmitted from the second antenna 420 is received by the first antenna 410. Wireless power transfer using various techniques and frequencies is known in the art and will not be elaborated upon herein so as to avoid obfuscating more significant aspects pertaining to the disclosure. Energy from the signal received by the first antenna 410 is suitably converted using power conversion circuitry (not shown) and an appropriate voltage is provided to the memory 405 as well as other processing elements such as a processor (not shown). In one embodiment, the transponder 215 transmits information by modulating the wireless signal transmitted by the wireless reader 230, which receives the modulated signal and recovers the data used by the transponder 215 to modulate such signal. Connectivity between the first antenna 410 and the power receiving circuitry, as well as other circuit elements (not shown) such as a processor for example, is indicated by the dashed lines 411 and 412. The processor can be used to retrieve the provisioning related identifier from the memory 405 and to enable the first antenna 410 to wirelessly transmit the provisioning related identifier to the second antenna 420 (or another antenna, not shown in FIG. 4) contained in the wireless reader 230. Connectivity between the second antenna 420 and other circuitry contained inside the wireless reader 230, such as another processor for example is indicated by the dashed line 421.

Figure 5:
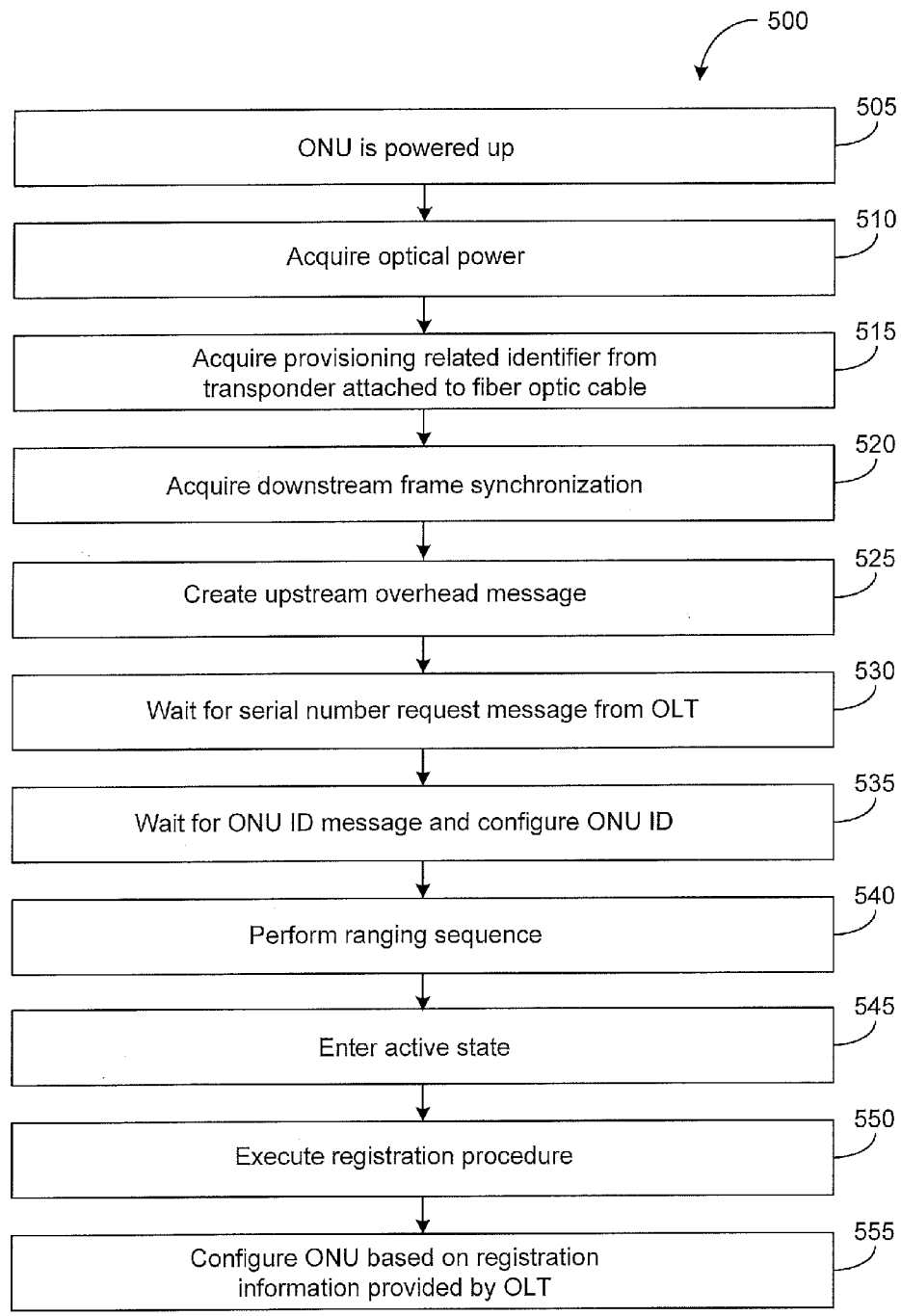
FIG. 5 shows a flowchart pertaining to a method of executing a registration procedure in accordance with the disclosure.

FIG. 5 shows a flowchart 500 pertaining to a method of executing a registration procedure in accordance with the disclosure. In block 505, an ONU is powered up after getting connected to a PON (such as the PON 100 shown in FIG. 1). In block 510, the ONU acquires an optical power parameter by reading the strength of an optical signal received by the ONU via a drop-side fiber optic cable that is a part of the PON. If no optical signal is detected, the ONU waits to receive a signal before executing any additional steps. Upon having acquired the optical power parameter, and as indicated in block 515, provisioning related information is acquired by the ONU from the transponder attached to the drop-side fiber optic cable, in accordance with the disclosure as described above. The provisioning related information can be used for setting a registration identification (ID) in the ONU. If no provisioning related information is available, for example due to the lack of a transponder having been attached to the drop-side fiber optic cable, information is stored in the ONU to indicate that no registration ID is available for the ONU.

In block 520, downstream frame synchronization is acquired by the ONU followed by block 530 where the ONU creates an upstream overhead message. In block 530, the ONU waits for an ONU ID message transmitted by the OLT. Upon receiving the ONU ID message, the ONU is configured accordingly. After configuration, and as indicated in block 540, the ONU executes a ranging sequence. After completion of the ranging sequence, and as indicated in block 545, the ONU enters an active state. In block 550, a registration procedure is executed. As a part of the execution procedure, the ONU receives a password request (assuming that the OLT is configured for executing the registration procedure). The ONU responds to the password request by transmitting the registration ID (received from the transponder) to the OLT via the optical fiber, in the manner described herein. If no registration ID is available, a password response is sent to the OLT with a blank password field. Upon successful execution of the registration procedure, and as indicated in block 555, provisioning information is received from the OLT and the ONU uses the provisioning information to configure the ONU.

An exemplary procedure from a systems application perspective will now be described. As an initial step for implementing operations on the PON 100, registration information pertaining to one or more customer premises is entered into a network topology database. In accordance with the disclosure, the registration information stored in the network topology database corresponds to registration information stored in the memory 405 described above. When the ONU is installed, the registration information, particularly the registration ID is transmitted from the ONU to the OLT in the manner described above with respect to FIG. 5. If the OLT has provisioning data associated with the registration ID provided by the ONU, the OLT provides provisioning information to the ONU and services specified by the provisioning data are activated.

On the other hand, if the OLT does not have provisioning data associated with the registration ID provided by the ONU, the OLT transmits a discovery event to a network management system. The network management system sends a request message to the network topology database for obtaining the registration information associated with the customer premise. Upon obtaining the registration information, the network management system queries a billing/provisioning system to obtain provisioning data for the customer premise. The provisioning data is used to send provisioning information to the ONU and may also be stored in the OLT for future use.

In summary, it will be pertinent to point out that the methods and systems described in the present disclosure may be implemented in hardware, software, firmware or combination thereof. Features described in the form of the various functional blocks or structures may be implemented together (e.g., in a circuit board having logic device such as an integrated logic device and/or a field programmable gate array (FPGA)) or separately (e.g., as separate logic devices or separate circuit boards) that operate cooperatively with software stored in memory. The software portion of the methods of the present disclosure may be stored in one or more computer-readable storage mediums, each of which comprises instructions that, when executed, perform, at least in part, the described operations and methods. The computer-readable storage medium, which excludes signals, may comprise, for example, a random access memory (RAM) and/or a read-only memory (ROM). The instructions may be executed by a processing element which can include a processor (e.g., a digital signal processor (DSP), an application specific integrated circuit (ASIC), or an FPGA).

It will be also understood that the various embodiments described in the disclosure are directed at providing an understanding of the disclosure, and various modifications and alternative implementations can be derived by persons of ordinary skill in the art. All such modifications and implementations are encompassed herein in accordance with the disclosure.

Now, therefore the following is claimed:

1. A system comprising:
   a fiber optic cable;
   a passive communication device attached to the fiber optic cable, the passive communication device having stored thereon a provisioning related identifier; and
   an optical network unit (ONU) comprising a wireless reader and a communication unit, the wireless reader configured to wirelessly receive the provisioning related identifier from the passive communication device, when the fiber optic cable is coupled to the ONU, and to provide the retrieved provisioning related identifier to the communication unit, the communication unit configured to transmit the provisioning related identifier into the fiber optic cable in an upstream direction as a part of a provisioning procedure for provisioning the ONU.

2. An optical network unit comprising:
   a wireless reader configured to wirelessly receive a provisioning related identifier from a transponder that is attached to a portion of a fiber optic cable; and
   a communication unit coupled to the wireless reader, the communication unit configured to receive the provisioning related identifier from the wireless reader and transmit the provisioning related identifier into the fiber optic cable in an upstream direction.

3. The optical network unit of claim 2, wherein the provisioning related identifier comprises at least one of a location address, a common language equipment identification (CLEI) code, or an account number.

4. The optical network unit of claim 3, wherein the transponder is a passive communication device that is wirelessly powered by the wireless reader.

5. The optical network unit of claim 3, wherein the passive communication device is at least one of a radio frequency identification (RFID) device and a near field communications (NFC) device.

6. The optical network unit of claim 5, wherein the RFID device is located in an enclosure that is an integral part of the fiber optic cable.

7. The optical network unit of claim 5, wherein the RFID device is attached to the fiber optic cable.

8. The optical network unit of claim 5, wherein the fiber optic cable is a drop-side fiber that couples the optical network unit to an optical splitter as a part of a passive optical network (PON).

9. The optical network unit of claim 8, wherein the provisioning related identifier is uniquely assigned to the drop-side fiber.

10. A fiber optic cable comprising:
    a passive communication device having stored thereon a provisioning related identifier, the passive communication device accessible by a wireless reader located in an optical network unit (ONU) for executing a provisioning procedure when the fiber optic cable is coupled to the ONU, the provisioning procedure comprising the ONU retrieving the provisioning related identifier from the passive communication device and transmitting the provisioning related identifier into the fiber optic cable in an upstream direction.

11. The fiber optic cable of claim 10, wherein the provisioning related identifier comprises at least one of a location address, a common language equipment identification (CLEI) code, or an account number.

12. The fiber optic cable of claim 11, wherein the passive communication device is configured to be wirelessly powered by the wireless reader located in the ONU.

13. The fiber optic cable of claim 11, wherein the passive communication device is a part of a coupler used to couple the fiber optic cable to the optical network unit.

14. The fiber optic cable of claim 11, wherein the provisioning related identifier is uniquely assigned to the fiber optic cable.

15. A method of provisioning an optical network unit, the method comprising:
receiving, by the optical network unit (ONU), a provisioning related identifier that is stored in a transponder attached to a portion of a fiber optic cable; and
transmitting, by the ONU into the fiber optic cable, the provisioning related identifier.

16. The method of claim 15, wherein the provisioning related identifier comprises at least one of a location address, a common language equipment identification (CLEI) code, or an account number.

17. The method of claim 16, wherein the provisioning related identifier is transmitted from the ONU in response to a request for the provisioning related identifier from an optical line termination (OLT) unit.

18. The method of claim 17, wherein the request is a part of a discovery procedure initiated by the OLT unit.

19. The method of claim 16, wherein the transponder is a radio frequency identification (RFID) device and the provisioning related identifier is received from the transponder using RFID communication.

20. The method of claim 19, wherein the provisioning related identifier is uniquely assigned to the fiber optic cable by a network management system.

* * * * *